United States Patent
Akhavain Mohammadi et al.

(10) Patent No.: US 11,533,595 B2
(45) Date of Patent: Dec. 20, 2022

(54) METHOD AND APPARATUS FOR OPERATING FUNCTIONS AT MOBILE NETWORK NODES

(71) Applicant: HUAWEI TECHNOLOGIES CO., LTD., Shenzhen (CN)

(72) Inventors: Mehdi Arashmid Akhavain Mohammadi, Ottawa (CA); Peter Ashwood-Smith, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/175,520

(22) Filed: Feb. 12, 2021

(65) Prior Publication Data
US 2022/0264269 A1    Aug. 18, 2022

(51) Int. Cl.
*H04W 4/02* (2018.01)
*H04W 4/50* (2018.01)
*H04L 67/1021* (2022.01)
*H04W 24/02* (2009.01)
*H04W 4/60* (2018.01)

(52) U.S. Cl.
CPC ............ *H04W 4/50* (2018.02); *H04L 67/1021* (2013.01); *H04W 4/025* (2013.01); *H04W 4/60* (2018.02); *H04W 24/02* (2013.01)

(58) Field of Classification Search
CPC ......... H04W 4/50; H04W 4/025; H04W 4/60; H04W 24/02; H04L 67/1021
See application file for complete search history.

(56) References Cited

U.S. PATENT DOCUMENTS

2016/0301598 A1* 10/2016 Strijkers ................. H04L 67/60
2020/0367084 A1* 11/2020 Hjelm ................... H04W 24/02

\* cited by examiner

*Primary Examiner* — Joseph E Dean, Jr.

(57) ABSTRACT

A method, apparatus and system for operating functions at mobile network nodes is provided. Locations of target devices to be serviced by network functions, and locations of moving network nodes potentially hosting the network functions are determined. The network functions are then caused to operate at one or more of the network nodes during a specified time. These network nodes are selected to be proximate to the target devices during the specified time. The selecting is based on locations of the target devices and on locations of the network nodes. A virtual function can be deployed on a satellite network in such a manner that the function stays close to a target device, even though the satellites may move out of overhead position.

18 Claims, 9 Drawing Sheets

METHOD AND APPARATUS FOR OPERATING FUNCTIONS AT MOBILE NETWORK NODES

CROSS-REFERENCE TO RELATED APPLICATIONS

This is the first application filed for the present invention.

FIELD OF THE INVENTION

The present invention pertains to data networks having mobile network nodes, such as satellite mesh networks, and in particular to a method, apparatus and system for configuring mobile network nodes to include a particular function.

BACKGROUND

Data networks are often supported by data centers which provide physical communication, computing and data storage resources. Virtual functions are one means by which hardware elements of a data center can be configured to perform a particular task in support of the data network. When a hardware failure occurs, a virtual function can be moved to another resource within the same datacenter. This provides robustness against failure.

Networks are evolving to include mobile network nodes. For example, satellite networks involving constellations of linked communication satellites in low earth orbit (LEO) have recently been deployed and tested. When both network nodes and client devices are mobile, it becomes highly complex to manage communication links and services in the network.

Therefore, there is a need for a method, apparatus and system for operating functions at mobile network nodes that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method, apparatus and system for operating functions at mobile network nodes. For example, network functions such as virtual functions can be deployed at appropriate satellite nodes, suitably located with respect to (e.g. proximate to) a target device, at appropriate times, and migrated as necessary to maintain such suitable location.

Embodiments of the present invention provide for an electronic apparatus comprising a processor, a memory and a communication interface. The electronic apparatus is configured to determine locations of one or more target devices to be serviced by one or more network functions. The electronic apparatus is further configured to determine locations of a plurality of moving network nodes. The electronic apparatus is further configured to cause the one or more network functions to operate at one or more of the network nodes during a specified time interval. The one or more of the network nodes are selected based on the locations of the one or more target devices in combination with the locations of the plurality of network nodes, in order to satisfy one or more operational criteria during the specified time interval. For example, the network nodes may be selected to be physically proximate to the target devices, or selected so that a communication signal of given quality can be established between the network nodes and the target device.

The electronic apparatus may be part of one of the network nodes at which the one or more network functions operate during the specified time interval. In such embodiments, the electronic apparatus may select its own network node as a network node at which the network function(s) are to operate during the specified time interval. The electronic apparatus may be part of a network node at which one of the network functions operates at a time prior to the specified time interval. The electronic apparatus may be separate from the plurality of moving network nodes, or the electronic apparatus may be part of an arbitrary one of the plurality of moving network nodes. The electronic apparatus may be distributed across two or more separate networked devices cooperatively configured to perform one or more of: said determining locations of target devices; said determining locations of said plurality of network nodes; and said causing the one or more network functions to operate at network nodes during the specified time interval. In such embodiments, the two or more networked devices may include at least one of the plurality of network nodes, or the two or more networked devices may include two or more of the plurality of network nodes.

In some embodiments, the apparatus may further be configured to cause the one or more network functions to operate at two or more different selected nodes of the plurality of network nodes at two or more different times, in order to maintain satisfaction of the one or more operational criteria during each of the different times.

In various embodiments, the target device is mobile or the target device is stationary. The network nodes may move according to a predetermined predictable pattern. Some or all of the network nodes may be satellite network nodes in non-geostationary orbit.

Embodiments of the present invention provide for a system comprising a plurality of electronic apparatuses, each corresponding to a respective one of a plurality of moving network nodes. The system is configured, by cooperative action of the electronic apparatuses, to determine locations of one or more target devices to be serviced by one or more network functions. The system is further configured to determine locations of the plurality of moving network nodes. The system is further configured to cause the one or more network functions to operate at one or more of the network nodes during a specified time interval. The one or more of the network nodes are selected based on the locations of the one or more target devices in combination with the locations of the plurality of network nodes, in order to satisfy one or more operational criteria during the specified time interval. Various other embodiments of the system are similar to embodiments of the apparatus as described above.

Embodiments of the present invention provide for a method, performed by one or more electronic apparatuses in a network. The method includes determining locations of one or more target devices to be serviced by one or more network functions. The method further includes determining locations of a plurality of moving network nodes. The method further includes causing the one or more network functions to operate at one or more of the network nodes during a specified time interval. The one or more of the network nodes are selected based on the locations of the one or more target devices in combination with the locations of the plurality of network nodes, in order to satisfy one or more operational criteria during the specified time interval.

Various other embodiments of the method are similar to embodiments of the apparatus as described above.

Related embodiments of the present invention provide for a method involving multiple nodes of the network, where plural nodes perform operations commensurate with the above-described method.

Related embodiments of the present invention provide for a system comprising multiple apparatuses forming a network, where one, some or all of the apparatuses are configured as described above.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

In communication networks, it is typical to have mobile client devices which change location and access the network, for example through wireless communication with an access point. The access points are equipped with wireless communication capabilities and are referred to herein as network nodes, or alternatively network elements or hosts. Client devices can include computers, smartphones, or other electronic equipment outfitted with wireless (e.g. radiofrequency) communication capabilities. Fifth-generation (5G) networks are an example of such a communication network. In the past, network nodes were typically stationary structures which were also linked to a core network via wired, wireless or optical backhaul communication links. However, in present and future networks, network nodes can also be mobile.

For example, network nodes operating as access points or otherwise serving client devices can be integrated into vehicles, portable devices, balloons, unmanned ground, water or aerial vehicles, or satellites. Such network nodes can have a wireless or free-space optical backhaul link. The use of mobile network nodes allows for network access in remote locations, and, if the network nodes can be moved arbitrarily, they can be dynamically relocated in response to demands. The mobile nodes can communicate with one another in ad-hoc or peer-to-peer manner via inter-node communication (e.g. backhaul) links. Embodiments of the present invention are described primarily with respect to satellite network nodes, for example in low-earth orbit (LEO) or in another other non-geostationary orbit. However, such an application is not necessarily intended to be limiting.

One approach to providing network services is to deploy reconfigurable or programmable network nodes. The nodes can be configured to provide a certain service or functionality by causing a certain program, also referred to as a function or virtual function, to operate at the node. The function can be pre-loaded onto the node and activated or deactivated as needed. Alternatively, the code (e.g. executable computer program code) for the function can be communicated to the node as needed and then activated. The function can be migrated between nodes, for example by communicating the code from a first network node to a second network node, for execution by the second network node after execution by the first network node. The communication can be via a peer-to-peer network, for example by communicating the code from the first node to the second node either directly or via one or more intermediate network nodes.

Given the above, embodiments of the present invention involve causing a function (or more than one function) to operate at a selected network node (or at more than one selected node) during a specified time, which for greater certainty may be referred to as a time interval for example having a start time and (possibly) an end time. The network nodes are moving. The network nodes are selected so that they are suitably physically located relative to (e.g. physically proximate to) a target device during the specified time. The target device may also be moving, or the target device may be stationary. The target device is a client device to be served by the selected network node, and particularly by the function operating at the selected network node.

The time interval is an interval during which the function operates at a given node. The function may operate at different nodes during different successive (e.g. contiguous) time intervals. The function may terminate operation at some time or the function may continue operating at a given node or at different nodes indefinitely.

Embodiments of the present invention are described primarily from the perspective that a function is to be located proximate to a target device. For example the virtual function may be located in a satellite which is (e.g. directly) overhead of the target device. Proximity to a target device is considered to be one form of operational criteria. However, it should be understood that, according to various embodiments of the present invention, the function can alternatively be suitably physically located relative to a target device in other ways, in order to satisfy one or more other operational criteria, such as in, but not necessarily limited to, the following examples. For example, the function may be located at a node which has a strongest or adequately strong communication link (in one or both of transmit and receive directions) with the target device. As another example, the function may be located at a node which has adequate levels of one or more communication quality parameters, such as propagation delay, bandwidth, jitter, signal-to-noise ratio, bit error rate, or other parameters. As another example, the function may be located at a node which is located at a particular angle of elevation relative to the target device. As yet another example, the function may be located at a node which has line of sight to the target device. As yet another example, the function may be located at a node which is expected to stay in a suitable configuration (e.g. having an adequately strong communication link) relative to the target device for at least a given period of time. As yet another example, the function may be located at a node which is able to monitor (e.g. using a camera or other sensor) the target device with adequate or best quality. The function may be located at a node which satisfies a combination of criteria, such as those listed above. More generally, operational criteria refer to one or more conditions under which it is desired to operate the function or functions, where such conditions can be adjusted (e.g. improved) by moving the function to a given one or more network nodes at given locations, in view of locations of one or more target devices.

Causing the function to operate at the selected network node can involve migrating the function to the selected network node in time for its operation at the specified time. Migrating the function can involve transferring code from one node to another, possibly through one or more intermediate nodes. In more detail, at least one network function can be operated at a first node of the plurality of network nodes during a first time prior to the specified time interval, and operated at a second node of the plurality of network nodes during the specified time interval. In such cases, embodiments of the present invention can involve, for example by the electronic apparatus implementing a supervisory function, performing communication operations for migrating the at least one function from the first node to the second node. In some further embodiments, this may involve securely erasing the network function from the first node upon determining that the network function is migrated to the second node. In some further embodiments, the at least one function is associated with a state which stores values based upon which the at least one function operates. In such embodiments the present invention may involve, for example by configuration of the electronic apparatus, performing communication operations for migrating the state from the first node to the second node along with the at least one function. In some further embodiments, the at least one function is associated with a state which stores values based upon which the at least one function operates, and the state is stored remotely from the at least one function and not migrated along with the at least one function. In some further embodiments, for a make-before-break implementation, migrating the at least one function comprises activating the at least one function at the second node prior to deactivating the at least one function at the first node.

Causing the function to operate at the selected network node can involve having the function pre-loaded onto many network nodes, and activating the function at the selected network node at the selected time. Accordingly, at least one network function may be installed at multiple ones of the plurality of network nodes and switchable between an active state and an inactive state. In such embodiments, causing the at least one function to operate at one or more of the network nodes during a specified time interval involves switching the at least one function at those network nodes to the active state during the specified time interval.

Embodiments of the present invention involve causing the function to operate at multiple selected network nodes at multiple successive times. This may involve repeatedly performing selecting of a network node and the causing of the function to operate at the network node at each of the successive times, treated as different specified times. In this way, the function can dynamically migrate or activate across a plurality of network nodes in order to cause the function to hover or stay in a particular location (e.g. to stay close to or otherwise suitably positioned relative to a stationary target device), or to move along a particular trajectory (e.g. to stay close to or otherwise suitably positioned relative to a moving target device). In other words, the selecting allows for functions to move between moving network nodes in order to provide localized service to a stationary or mobile target device.

In some embodiments, multiple cooperating functions may be deployed for example in order to provide a particular service. These functions may be operated at selected nodes in a coordinated manner. In some embodiments, some or all of the functions may all be located at a single node, for example being moved together between nodes. In some embodiments, at least some of these functions may be required to be located at nodes which satisfy certain requirements, such as propagation delay requirements for communication with a target device. In order to satisfy such requirements the at least some of the functions are required to be at nodes which are suitably positioned (e.g. proximate to) a target device or set of target devices. Other ones of the functions can be positioned according to other, e.g. less strict operational criteria. For example the other ones of the functions can be positioned further from the target device or set of target devices. However, the functions can still be moved together either all at once or with some functions moved according to more strict requirements while other functions are moved, possibly less frequently, according to less strict requirements.

In some embodiments, a function may be separated into multiple cooperating parts, each potentially operating at a different network node. In such embodiments, each cooperating part can be considered as a function. Alternatively, the function can be considered in its entirety and causing the function to operate at multiple nodes may be performed based on the locations of the target devices in combination with the locations of the network nodes, in order to satisfy operational criteria. The operational criteria can account for different combinations of nodes being used to provide the single function.

A first example scenario involving the present invention is as follows. A set of non-geostationary satellites are deployed to provide communication service, such as Internet or 5G network connectivity, to terrestrial or non-terrestrial target devices. The satellites orbit earth in a constellation formation, for example involving multiple trains of satellites, where each train includes multiple satellites being spaced apart and following a same or similar orbital trajectory at a same or similar altitude. In this first example, the target device is stationary or moves slowly or in a limited range. It is desired to emulate the same type of communication service that would be provided by a geostationary satellite located overhead of the target device. To do so, as different satellites pass overhead of the target device in succession, a function is passed from one satellite to the next, so that the function is operated by a satellite currently overhead of the target. The function can be passed to the satellite which is closest to the target, e.g. most directly overhead, or to one of multiple satellites which are among the closest to the target, e.g. which are substantially directly overhead at the same time. The function is configured, when executed, to provide the desired communication service.

More generally, embodiments of the present invention may be deployed, on moving network nodes, to emulate or approximate a network comprising stationary nodes. This can be done by moving virtual functions, which implement the network functionalities, between network nodes in a manner such that the virtual functions are approximately stationary relative to a given reference frame, such as relative to ground, relative to a target device, or relative to a group of target devices.

It should be understood that the present invention is not necessarily limited to providing communication service. The service provided can be arbitrary. Examples include tracking or monitoring services, such as video or radio tracking services, data streaming services, security services, entertainment services, computing services, or the like, or a combination thereof.

Figure 1:
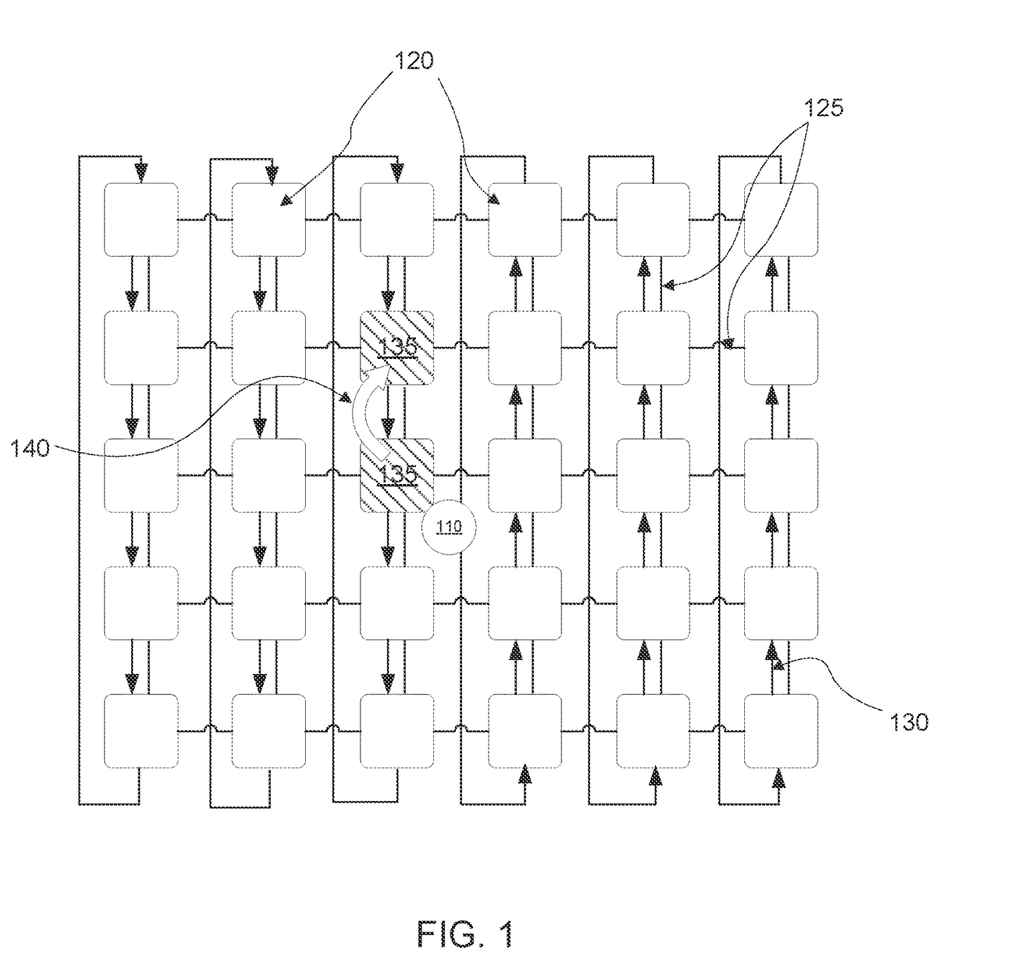
FIG. 1 illustrates an example scenario according to an embodiment of the present invention, in which a network function is deployed successively on multiple moving network nodes proximate to a stationary target.

FIG. 1 illustrates the first example scenario according to an embodiment of the present invention. A stationary target device 110 is to be served by a virtual function hosted by a network. The network includes a set of moving network nodes 120 which are coupled together via communication links 125. Arrows 130 represent the direction of motion of the network nodes 120. In the illustrated example, nodes are divided into multiple sets, each of which moves in a generally circular or closed loop pattern. This can be the case for satellite networks, for example, in which multiple trains of orbital satellites are deployed and interconnected. A virtual function 135 is deployed and its location is managed so that it is always at a network node that is substantially overhead of the target device 110, or otherwise physically proximate or suitably positioned with respect to the target device. As the nodes move, different nodes are sequentially overhead of the target, and the virtual function is caused to operate at the node which is currently overhead. This may involve moving (e.g. migrating) 140 the virtual function from one node to the next at a particular time. In FIGS. 1-4, shaded and unshaded boxes represent network nodes, while shaded boxes represent the presence of a function at a network node. Except for in FIG. 4, circles represent target device locations.

A second example scenario is similar to the first example scenario, except that the target device is moving (mobile) at a significant speed over a significant range. In this case, the location of the target device is tracked over time as it changes and this information is used, in combination with information on motion of satellites, to determine which satellites are overhead of the target device at a succession of different times. Based on this information, the function is passed from one satellite to the next, so that the function is operated by a satellite currently overhead of the target at its current location. Passing the function may involve migrating the function by communicating code from one satellite to the next, the communication being either direct or via one or more intermediate satellites or other network nodes.

Figure 2:
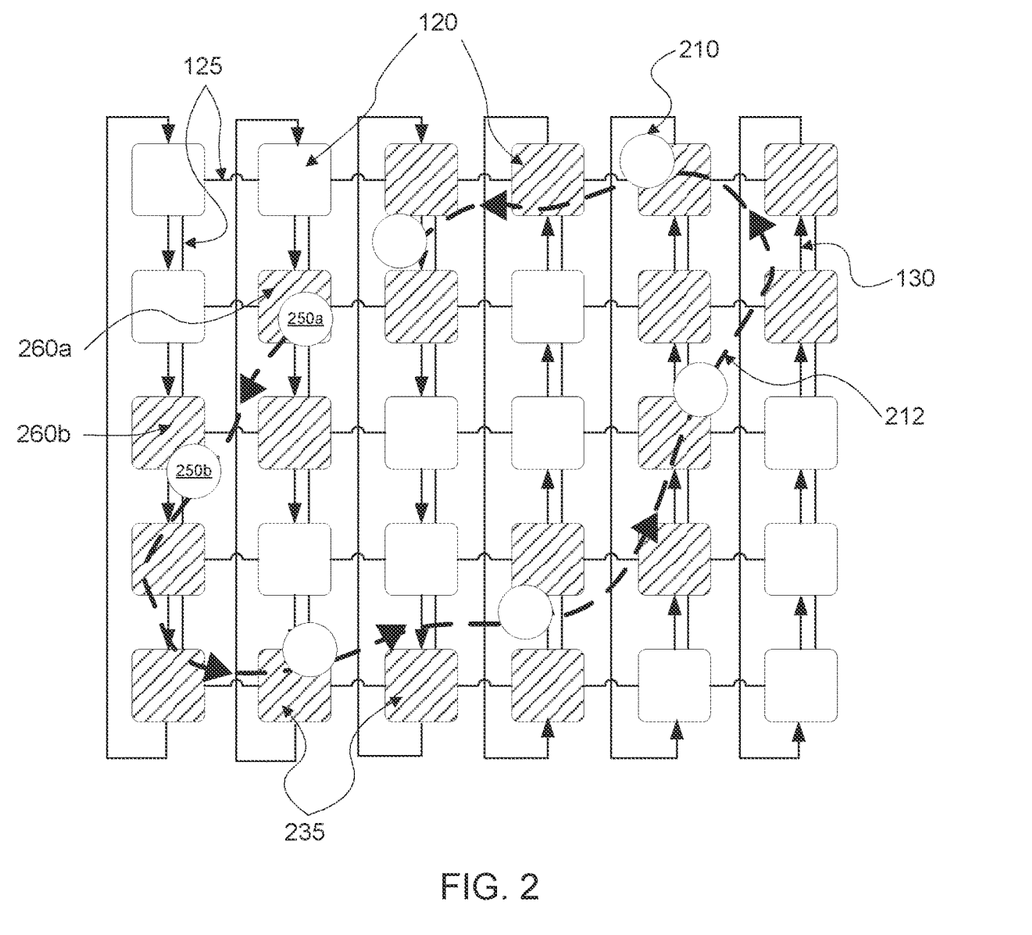
FIG. 2 illustrates an example scenario according to an embodiment of the present invention, in which a network function is deployed successively on multiple moving network nodes proximate to a mobile target.

FIG. 2 illustrates the second example scenario according to an embodiment of the present invention. A moving target device 210 is to be served by a virtual function hosted by a network. The network again includes a set of moving network nodes 120 which are coupled together via communication links 125. Arrows again 130 represent the direction of motion of the network nodes 120. In the illustrated example, nodes are divided into multiple sets, each of which moves in a generally circular or closed loop pattern. A virtual function 235 is deployed and its location is managed so that it is always at a network node that is substantially overhead of the target device 210, even as the target device moves along a path 212. As the nodes and the target device move, different nodes are sequentially overhead of the target, and the virtual function is caused to operate at the node which is currently overhead. This may involve moving the virtual function from one node to the next at a particular time. For example, when the target device is at location 250a, the virtual function can be caused to operate at node 260a. When the target device next moves to location 250b, the virtual function can be caused to operate instead at node 260b.

It is noted that, if the target device moves in the same direction and with substantially the same speed as an overhead node, the virtual function may not necessarily be moved for some time, because the node naturally follows the target device. If nodes are controllably movable, embodiments of the present invention may be combined with techniques in which nodes are controllably moved to follow target devices.

It is also noted that, if the target device moves (e.g. "diagonally") from a first location to a second location, where the node at the first location is not directly communicatively coupled to the node at the second location, then moving or migrating the virtual function may involve a multi-hop communication through the network from the node at the first location to the node at the second location.

Figure 3:
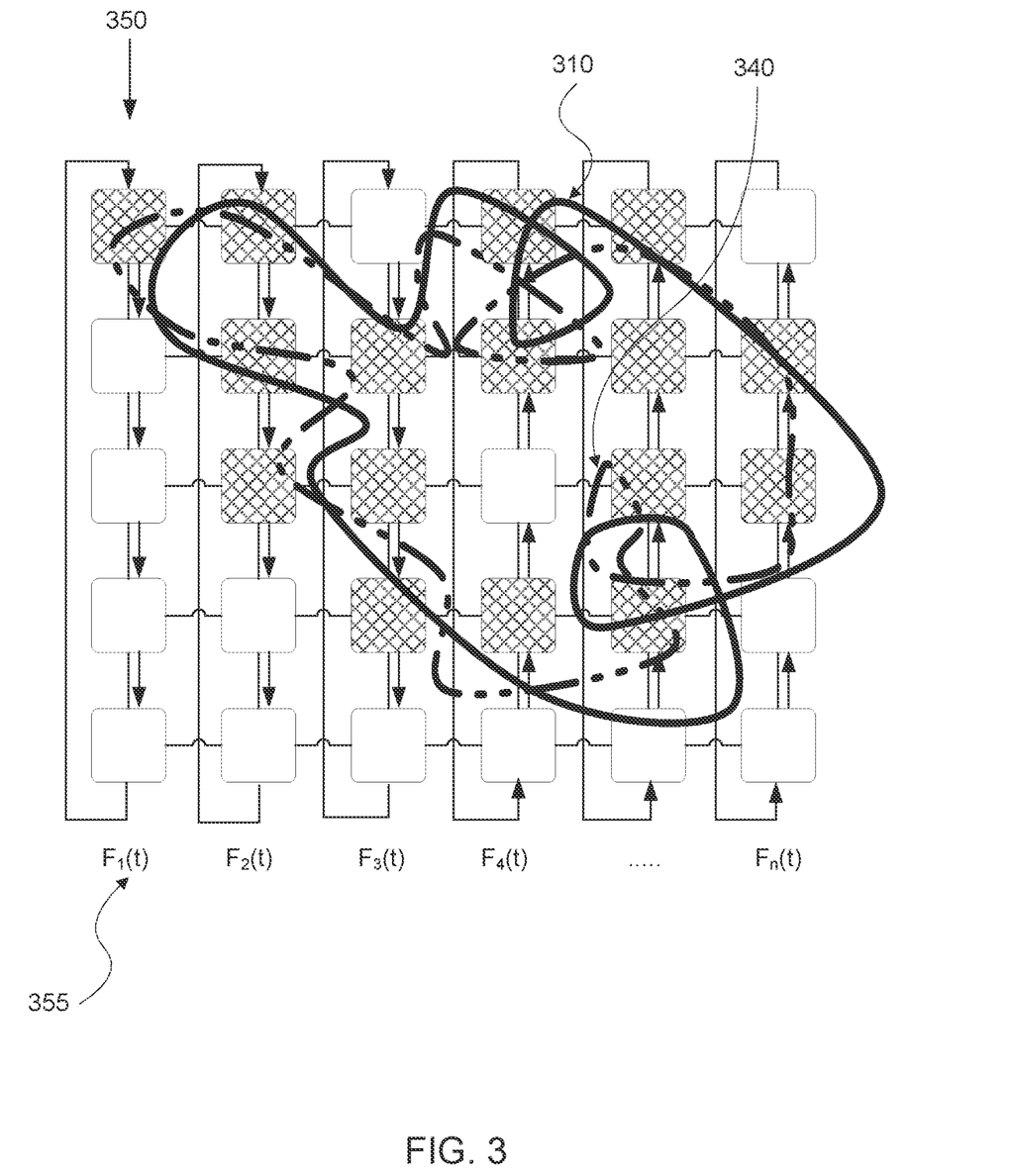
FIG. 3 illustrates a path of a network function following a moving target, in accordance with an embodiment of the present invention.
Figure 4:
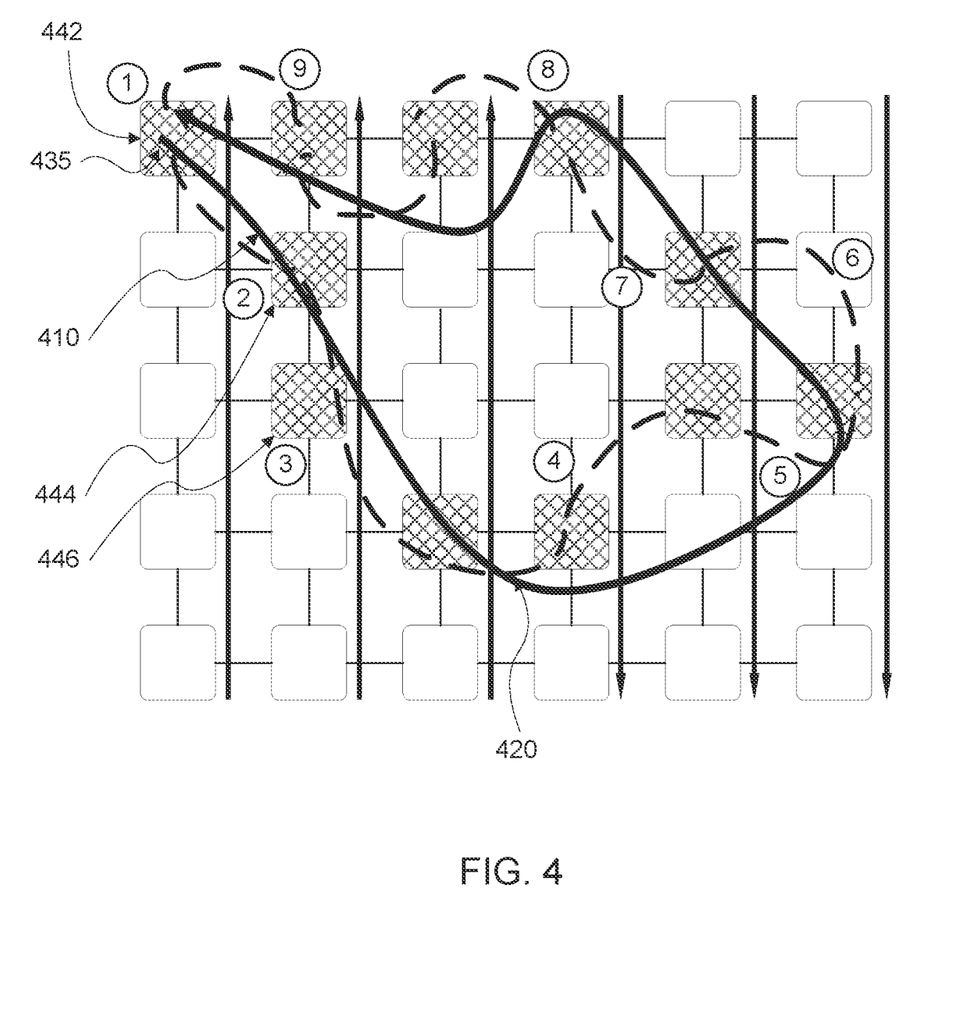
FIG. 4 illustrates a path of a network function following a moving target, in accordance with another embodiment of the present invention.

FIGS. 3 and 4 illustrate aspects of the second example scenario in accordance with other embodiments of the present invention. For purposes of explanation, the (changing) locations of target devices, network nodes, and virtual functions are expressed as functions of time. These functions can denote the location of an object with respect to a given coordinate system, such as a Cartesian or polar coordinate system. The location(s) of each node of a set of one or more network nodes is expressed as a time-varying function $F_n(t)$, where t denotes time. There may be multiple such functions, indexed by subscript n. The location of a target device is expressed as a time-varying function $G(t)$. The location of a virtual function (network function) is expressed as a time-varying function $F_{vf}(t)$. This notation can be extended to handle multiple target devices, multiple virtual functions, or both, for example by having $G(t)$ and $F_{vf}(t)$ as vector-valued functions, or by defining multiple such functions distinguished by respective indices.

FIG. 3 illustrates the path 310 of a moving target device, and the path 340 of a virtual function as it changes locations over time, to operate at different network nodes at different times such that the virtual function is proximate to the target device. The path 310 of the target device can be expressed using the function $G(t)$ which gives the location of the target device at time t. The path 340 of the virtual function can be expressed using the mathematical function $F_{vf}(t)$ which gives the location of the virtual function at time t. Strictly speaking, the virtual function is always co-located at a network node, however the path 340 is shown as being continuous and interpolated between host network nodes to show the evolution of travel more clearly. The value of $F_{vf}(t)$ may be a set of location coordinates.

A number n of sets of moving network nodes are shown. Each set of nodes is shown as a column of nodes (e.g. column 350), and different (horizontally separated) columns of nodes correspond to different sets of nodes. The locations of each set of nodes is given by a vector-valued function $F_n(t)$ (e.g. $F_1(t)$ 355), where each element of the vector may correspond to the location of one node of the set of nodes. The value of $F_{vf}(t)$ at a given time t will depend on the values of $F_n(t)$ at time t, insofar as $F_{vf}(t)$ can only take on values that are represented by an element of $F_n(t)$, for some value n. This is because the virtual function must be located at a network node. During times that the virtual function dwells at a given node, the value of $F_{vf}(t)$ will evolve over time in the same way as one element of $F_n(t)$, for some value n, the element and value being given according to which node the virtual function currently dwells at.

Furthermore, according to various embodiments, the node at which the virtual function dwells at, at each of a plurality of times, may be selected so as to achieve the approximate equality $F_{vf}(t) \approx G(t)$. In other words, the virtual function is located at nodes, which are selected over time in such a manner that the virtual function location is approximately equal to the target device location. In some embodiments, the nodes are selected so that the virtual function is as close as possible to the target device. In some embodiments, the nodes are selected so that the virtual function is adequately close to or otherwise suitably positioned relative to the target device, but subject to other constraints. Possible constraints include communication costs, switching costs, delay factors, bandwidth factors, quality of service factors, etc.

FIG. 4 illustrates the path 410 of a moving target device, along with an example path 420 of a virtual function 435 as it operates at different moving network nodes over time. In this and other embodiments, the target device is shown as following a closed loop path, however this is not necessarily the case. The virtual function is again located such that $F_{vf}(t) \approx G(t)$ 420. At time 1, the virtual function is located proximate to the target device initial position, at a first node 442 in the upper-left corner of the figure. At time 2, the virtual function is moved to a second node 444 which is not directly adjacent to the first node. Accordingly, a multi-hop communication may be required to migrate the virtual function (and possibly the state) from the first node to the second node. At time 3, the virtual function is moved to a third node 446 below the second node. The virtual function is moved between successive nodes, at times 4, 5, 6, 7, 8 and 9, in a similar manner.

Figure 5:
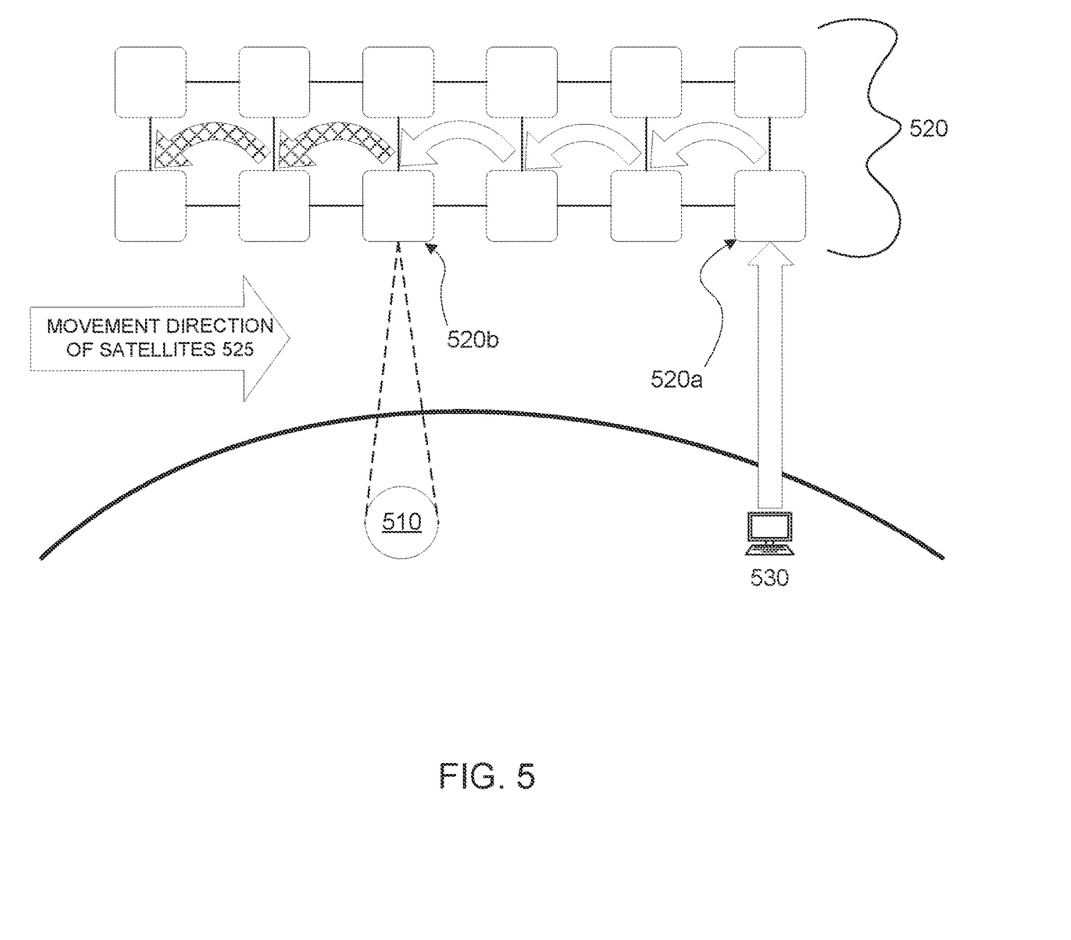
FIG. 5 illustrates an example embodiment of the present invention involving network nodes as LEO satellites located overhead of a target device.

FIG. 5 illustrates an example embodiment which is particular to network nodes 520 as LEO satellites located overhead of a target device 510. The satellites move in orbit in the direction of arrow 525. A virtual function is initially uploaded from a (e.g. ground station) location 530 to a first satellite node 520*a*. The virtual function can include software, code, data address, etc. The software and code can be the code for executing the virtual function and supervisory function. The software, code, data address or other information can include information required to move the virtual function from its initial location to a suitable location relative to the target device. Information on the target device movement pattern, the LEO satellite movement patterns, etc. can also be included. The virtual function includes or is paired with a supervisory function which directs migration of the virtual function. In other words, each network node is configured to execute software and thereby implement the supervisory function. The supervisory function can determine the target location for example by obtaining target location data, either through passive observation or active querying. The supervisory function can also determine network node locations for example by accessing satellite schedule (e.g. almanac) data. The supervisory function is configured to move the virtual function, and itself, from node to node in order to locate the virtual function, and itself, overtop of the target device, based on the location data. For example, the supervisory function can determine which network node is closest to the target device and then move itself and the virtual function to (or toward) this network node 520*b*. In some embodiments moving the virtual function includes transmitting code for instantiating the virtual function (and supervisory function) from one node to another. When a node receives the code, it executes it, thereby becoming an apparatus embodying the virtual function at least temporarily. In this way, the virtual function can be made to seek out target devices and maintain position at a suitable location relative to the target devices (e.g. proximate to the target devices). As the target devices move, the supervisory function determines that a new node is closest to the target device, and causes the virtual function to move again.

In some embodiments, the virtual function is made to seek out the closest network node to the target device. In other embodiments, constraints may be introduced, and the virtual function is made to seek out the network node which is closest to the target device while the constraints are respected. In some embodiments, rather than seeking out the closest network node, the virtual function is made to seek out one of a set of nodes which are relatively closer to the device, compared to all nodes.

Figure 6:
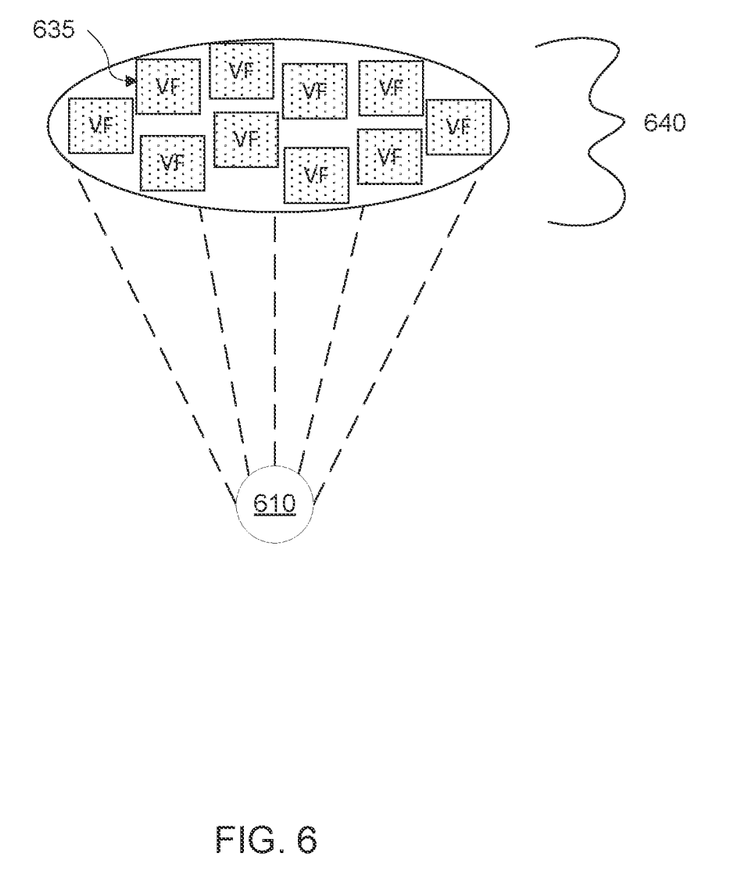
FIG. 6 illustrates an example embodiment of the present invention involving network nodes as LEO satellites located overhead of a target device, from the perspective of the target device.

FIG. 6 illustrates another example embodiment which is particular to satellites or other network nodes which are located overhead of a target device 610. This illustration is from the perspective of the target device, and shows that the virtual function 635 may change locations over time, taking on a variety of locations, while still staying within a limited region 640 above the target device. The location of the virtual function may follow a pattern in which the virtual function gradually changes location over time (corresponding to motion of a network node), intermittently punctuated by jump changes in location, as the virtual function changes host nodes. By configuring the virtual function to change nodes in a make-before-break manner, in which a newer instantiation of the virtual function becomes operational at a new node location before it takes over responsibilities from an older instantiation of the virtual function, interruptions in service to the target node can be mitigated.

In a third example scenario, multiple functions are located at particular satellites at particular times, in order to serve a single target device. Each of the multiple functions can be located at a same satellite at a same time, or different ones of the multiple functions can be located at different satellites at the same time. In some embodiments, different functions may be located in order to satisfy different requirements. The functions may cooperate to provide a service. For example, some of the functions may be required to be physically proximate to a target device (or otherwise suitably located in order to satisfy stricter criteria) while other ones of the functions may not be subject to these same requirements. Some functions in a cooperating group of functions may be moved from node to node in order to keep requirements satisfied, while other ones of the functions in the cooperating group are not necessarily moved, or not moved as frequently. In some embodiments, an orchestrator may be provided (e.g. a supervisory apparatus) which coordinates the relocation of functions, or the relocation of groups of functions. This coordinated movement may be performed in a make-before-break manner, and with measures taken to maintain links between functions in a cooperating group.

In a fourth example scenario, one or multiple functions are located at one or multiple satellites at particular times, in order to serve multiple target devices. The multiple target devices can be tracked together or individually. The multiple target devices can be close together or distant from one another. The multiple target devices can be moving in a coordinated or non-coordinated manner with one another.

Figure 7:
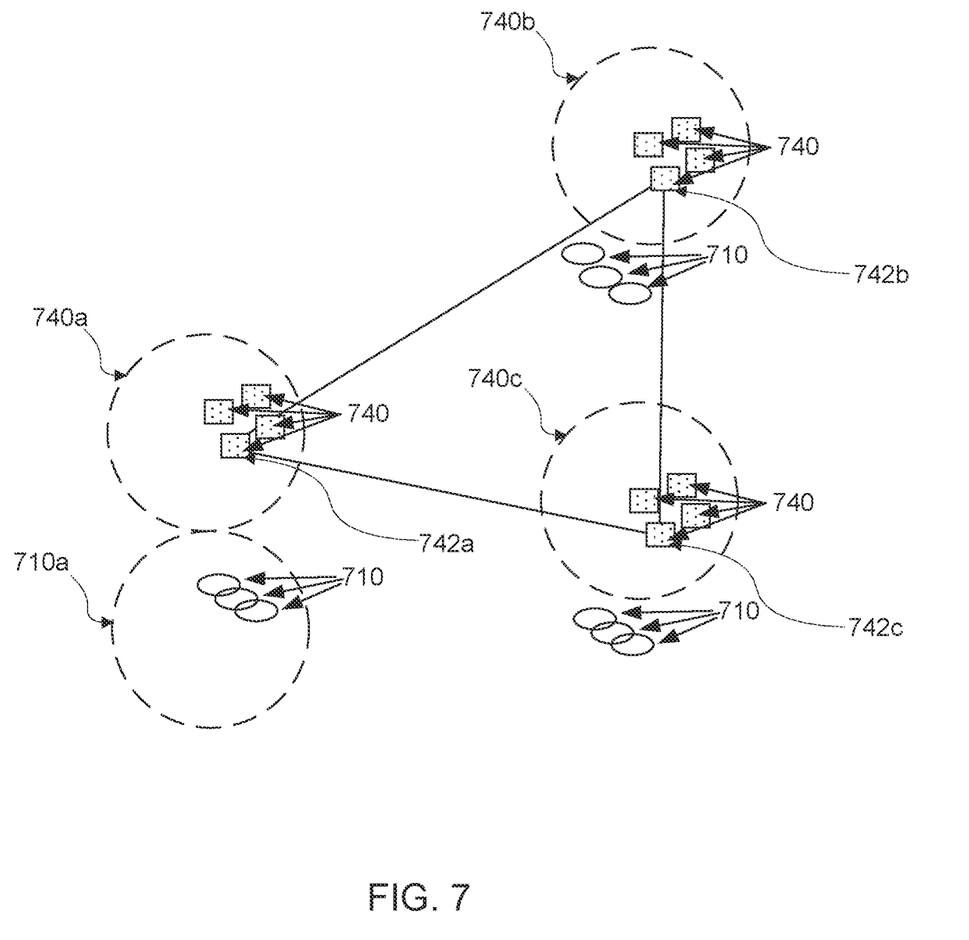
FIG. 7 illustrates an example scenario in which multiple virtual functions are located proximate to multiple target devices, in accordance with an embodiment of the present invention.

FIG. 7 illustrates an example scenario in which multiple virtual functions 740 are located proximate to multiple target devices 710. The target devices can be located in multiple spatially separated groups, and a group of virtual functions can be deployed to serve each group of target devices. For example virtual function group 740a can be located at one, or multiple, network nodes proximate to group 710a of target devices, for serving those target devices. As one example, the each virtual function group 740a, 740b, 740c can include multiple virtual functions which, operating together, provide a virtualized 5G network serving the proximate group of target devices. One virtual function out of each set, i.e. 742a, 742b, 742c can be a gateway virtual function which communicatively couples the groups of virtual functions, and therefore the target devices of different groups, together. In an example deployment scenario, the target devices can be groups of ocean going vessels and the network nodes at which the virtual functions are instantiated can be LEO satellites. In an example embodiment where the functions cooperate to provide an LTE network, the functions can include a function causing a node to operate as a eNB, a function causing a node to operate as a serving gateway (SGW), a function causing a node to operate as a packet data network gateway (PGW), a function causing a node to operate as a mobility management entity (MME), and a function causing a node to operate as a home subscriber server (HSS). The function causing a node to operate as a eNB may be required to be at a node which is adequately proximate to a target device, while the function causing a node to operate as a HSS may not be subject to the same strictness of requirement.

As illustrated in FIG. 7, a service may be provided which consists of multiple functions. The functions may all be located in one network node or spread across multiple network nodes. If the functions are spread across multiple network nodes, different functions may be located based on different operational criteria. For example, some functions (e.g. providing eNB) may be required to be located at nodes which are as close as possible to a target device, or which have as good as possible of a communication signal with a target device. Other functions (e.g. providing HSS) may be required to be suitably close to the target device, but not necessarily as close as possible. This can allow for the functions to be located at nodes which are more distant from the target device, which in turn allows for other criteria to be used in addition to location-based criteria, for selection of the node to house such functions.

Accordingly, in some embodiments of the present invention, a first network function is caused to operate at a first one or more network nodes during a specified time interval, while a second network function is caused to operate at a second one or more network nodes during the specified time interval. The first one or more network nodes and the second one or more network nodes are selected based on the locations of the one or more target devices in combination with the locations of the plurality of network nodes. However, the first one or more network nodes are selected in order to satisfy a first operational criteria, while the second one or more network nodes are selected in order to satisfy a second, different operational criteria. The first operational criteria can be, for example, more strict than the second operational criteria. For example, the first operational criteria can require that a network node be selected which is substantially closest to a target device, while the second operational criteria can require that a network node be selected which is anywhere within a predetermined distance of the target device, where the predetermined distance encompasses a significant number of network nodes.

In some embodiments, for example as illustrated in FIG. 7, a service such as an enterprise wireless network service may be provided. The service can be implemented using multiple collaborating functions, which can be co-located or differently located. The operational criteria for locating different functions can be different, for example as described above. Accordingly, a method, apparatus and system can be provided which operate as follows. Locations of one or more target devices to receive the service can be determined. Locations of a plurality of moving network nodes can also be determined. At least a first function of the multiple collaborating functions can be caused to operate at a first one or more of the network nodes during a first specified time interval. The first one or more network nodes are selected based on the target device locations in combination with the network node locations, in order to satisfy a first one or more operational criteria. At least a second function of the multiple collaborating functions can be caused to operate at a second one or more of the network nodes during a second specified time interval. The second one or more network nodes are selected based on the target device locations in combination with the network node locations, in order to satisfy a second one or more operational criteria.

The second one or more network nodes can be the same, overlapping with, or different from, the first one or more network nodes. The second specified time interval can be the same, overlapping with, or different from, the first specified time interval. The second one or more operational criteria are different, for example more strict than or less strict than, the first one or more operational criteria. Additional functions of the multiple collaborating functions can be similarly located at network nodes, according to other operational criteria. The functions can be operatively coupled together via node-to-node communication. The functions can collaborate together to provide the service, which may be a communication service, a surveillance service, an enterprise network service, or the like, or a combination thereof. For example, the network nodes can be LEO satellites which provide an enterprise networking service to one or more target devices in one or more remote locations.

Although in the scenarios illustrated above the target device(s) and network nodes are shown as moving in a two-dimensional manner, it will be readily understood that the target devices, network nodes, or both, can move in a one-dimensional or three-dimensional manner.

The selecting of the network node at which to operate the function is generally based both on locations of the moving network nodes and locations of the target devices. These locations can be scheduled locations, observed locations or predicted locations, or a combination thereof. Locations can be known according to a schedule, for example in the case of satellite constellation information or information regarding planned location of network nodes or target devices moving in a scheduled or regular manner. Locations can be observed for example through the use of video or radiofrequency tracking, or obtaining reports of location for example based on communication of GPS coordinates. Locations can be predicted using various tracking, predicting or filtering routines, as would be readily understood by a worker skilled in the art. In particular, network nodes may move according to a predetermined predictable pattern, for example according to satellite orbits which can be known or predicted using knowledge of orbital mechanics, satellite speed or directional control, or a combination thereof.

A function can therefore "follow" a target device, or a group of target devices, over time. This can be accomplished by causing the function to operate at two or more different nodes at two or more different (e.g. sequential or contiguous) times, in order to maintain the function as being proximate to (or otherwise suitably located relative to) the target device or group of target devices during the two or more different times.

The apparatus may be located at one or more of a variety of locations inside or outside of the communication network. Different particular possibilities for the apparatus location are described in more detail below.

In some embodiments, the electronic apparatus which causes the function to operate at a given network node is part of that same given network node. That is, the apparatus may be one of the network nodes selected to be proximate to (or otherwise suitably located relative to) the one or more target devices during the specified time. This corresponds to the case where the apparatus, which directs where the function is to be located, is part of the network node that the function is currently locating to. This may be the case for example when each network node has the function pre-loaded onto itself, or has the capability to retrieve and install the function on demand from a remote source. The apparatus can then determine if its host network node is a suitable candidate for hosting the function at a given time, and then trigger such a hosting operation. The apparatus may select its host network node as the node at which the function is to operate during the specified time.

In some embodiments, the electronic apparatus which causes the function to operate at a given network node is part of a network node at which one of the network functions operates at a time prior to the specified time. This may correspond to the case where a supervisory function migrates with the network function(s), the supervisory function determining where the network function(s) should be instantiated next. In such embodiments, the network functions, combined with the supervisory function, can be self-directing, in that the supervisory function directs migration of the network functions throughout the network based on node and target device locations. The supervisory function can cause the electronic apparatus to perform as described herein. The supervisory function can migrate along with the network function(s) and in the same manner. Alternatively to migrating of functions (in which the function code is communicated from one node to another), the network function(s), supervisory function, or both, can be pre-installed at multiple nodes and selectably activated at desired nodes at desired times, for example by communicating a trigger message from one node to another.

In some embodiments, the electronic apparatus which causes the function to operate at a given network node is separate from the plurality of moving network nodes. Alternatively or the electronic apparatus may be part of an arbitrary one of the plurality of moving network nodes. In this case, the electronic apparatus, for example by virtue of a supervisory function operating thereon, operates as a supervisory apparatus, which determines the node at which the network function(s) should operate at each of a plurality of given times. Once a determination is made, the supervisory apparatus can transmit a message to the determined node, the message causing the network function(s) to operate thereat. The message can be a trigger message for activating a network function or functions pre-installed at the determined node. The message may include code containing the network function(s).

In the above embodiments, the electronic apparatus is described as a single device. However, the electronic device can be distributed across multiple devices, such as across multiple network nodes or other separate devices. The electronic device can be decentralized, virtualized across different physical hardware, or a combination thereof. For example, the electronic device can be distributed across two devices which include one, two or more of the network nodes. Two or more network nodes can thus cooperate to implement the electronic apparatus, and this may or may not involve coordinating communication. In some embodiments, a system comprising a plurality of electronic apparatuses may be provided and operated to implement the functionality of the electronic apparatus as described herein. The plurality of apparatuses may include some or all of the network nodes, for example.

As mentioned above, causing the function to operate at a network node can involve activating the function pre-installed at that network node, or else transferring (migrating) the function to that network node. Both options may involve messaging, unless the node self-activates its function based on its own information.

In some embodiments, the network function is operated at a first network node during a first time prior to the specified time, and operated at a second node of the plurality of network nodes during a second time. The electronic apparatus is configured to perform communication operations for migrating the at least one function from the first node to the second node. These communication operations can include communicating code that, when executed, causes an apparatus to execute the function. The code can be program code embodying the function for example. In some embodiments, the apparatus is further configured to initiate secure erasure of the network function from the first node upon determining that the network function is successfully migrated to the second node. This may be employed for example when the first network node is in an insecure location and security is desired for the network function.

In various embodiments, the function is associated with a state which stores values based upon which the function operates. Stateful functions are known in the art and allow the function to retain information between function calls. In such embodiments, it is desired to preserve the state over time, between both function calls and changes to the node at which the function operates. In some such embodiments, the electronic apparatus is configured to perform communication operations for migrating the state from the first node to the second node along with the function. In other words, the state can be stored in computer memory and migrated along with the function, for example as part of a communication operation between nodes. In other such embodiments, the state is stored remotely from the function and not migrated along with the function. For example, the state can be stored at another remote device and accessed remotely by the function, using a communication operation. The state can be stored at the same remote device even when the function is operated at (e.g. migrated to) a new node.

In various embodiments, when migrating a function, or when changing which network node hosts an active version of the function, a make-before-break methodology is employed. In this case, the function is activated at a second node prior to deactivating the function at a first node, where the second node is to host the function after the first node does. This facilitates a continuity of service and mitigates interruptions in the service provided by the function.

Alternatively to transferring the function code from node to node, a function can be pre-installed at multiple network nodes. The function can then be switchable between an active state and an inactive state. In such embodiments, causing a function to operate at a given node during a specified time involves switching the function from the inactive state to the active state at a beginning of the specified time, and switching the function from the active state to the inactive state at an end of the specified time. Specified times thus typically refer to specified time intervals. Such an approach reduces the amount of communication required to transfer location of a function. The function can be installed at an arbitrary time either prior to or after deployment of network nodes.

The functions described herein can be virtual functions. The functions can be or correspond to computing machines configured in a particular manner according to executable computer program instructions. Virtual functions are computing machines that may be executed on virtualized computing resources. Virtualized computing resources can be computing environments that are built on top of real computing hardware. The virtual computing resources operate as an intermediate layer that the virtual function interacts with. As such, the virtual function is unaffected by changes to the underlying real computing hardware. A virtual function may take one of a variety of forms, such as but not necessarily limited to a software load/image, a process, a virtual machine, or operating system level virtualization container such as a Linux™ container or Windows™ container.

Figure 8:
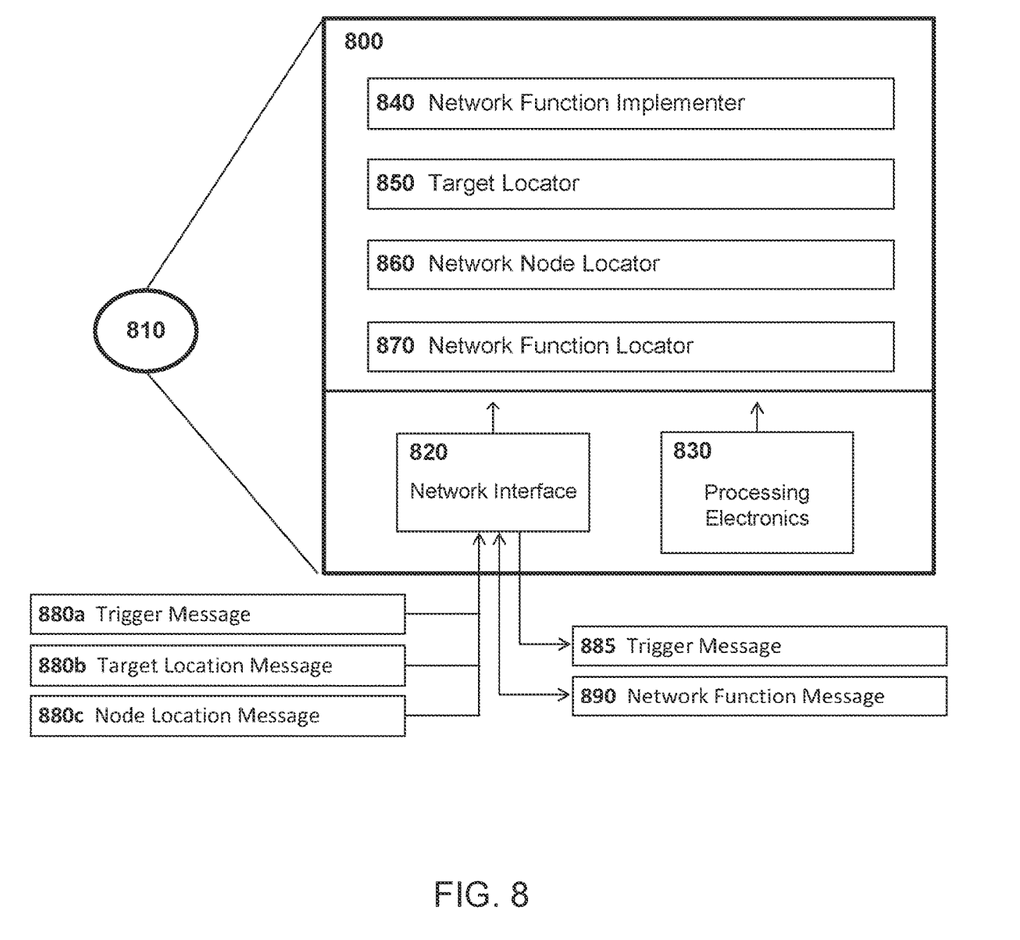
FIG. 8 illustrates an apparatus located in a network node, according to an embodiment of the present invention.

FIG. 8 illustrates an apparatus 800 located in a network node 810, according to an embodiment of the present invention. The apparatus 800 includes a network interface 820 and processing electronics 830. The network interface 820 can be a single network interface or a combination of network interfaces (e.g. including a satellite-to-satellite communication interface and a satellite-to-ground communication interface). The processing electronics can include components such as computer processors, memory, digital or analog circuits, or the like, or a combination thereof. The processing electronics 830 can, by executing program instructions stored in memory, be configured to implement several operations corresponding to the virtual function and supervisory function, as described herein. The processing electronics may include the memory, or the memory may be separate (not shown).

Accordingly, the processing electronics can be configured to implement a network function (e.g. virtual function) implementer 840 which, when configured, is configured cause the network node to implement any and all of the operations which are required for providing the network function and serving the target device. This may include communication, computation, and memory storage and retrieval operations.

The processing electronics can be configured to implement a target locator 850 which is configured to determine the location of a target device. This may involve storing an identifier of the target device, generating query messages regarding location of the target device, monitoring for responses to queries, using apparatus hardware (e.g. optical hardware, radio hardware, etc.) to search for the target device, store target device movement patterns, etc.

The processing electronics can be configured to implement a network node locator 860 which is configured to determine the location of some or all moving network nodes. This may involve obtaining network node location schedule information from a network supervisor or from individual network nodes. This may involve obtaining network node location real-time update report information from a network supervisor or from individual network nodes. This may involve monitoring for network node locations using apparatus hardware (e.g. optical hardware, radio hardware, etc.). This may involve obtaining and processing almanac or other schedule information indicative of node locations.

The processing electronics can be configured to implement a network function locator 870, which is configured to cause the network function to controllably instantiate at the network node, or relocate to another network node, or both, as required. The network function locator can cause the network function to operate at a network node during a specified time. The network function locator can select the network node as a node which is proximate to (or otherwise suitably located relative to) the target device during the specified time. The selecting may be based on target locations and network node locations, as obtained from the target locator 850 and the network node locator 860, respectively. The selecting may be based on various other attributes, such as node transmit power levels, antenna angles with respect to a target, etc.

The target locator 850, the network node locator 860, and the network function locator 870 can be configured to locate multiple targets, locate one function at (e.g. across) multiple network nodes, locate multiple functions across one or more network nodes, etc. Likewise, the network function implementer 840 may implement multiple network functions, or a portion of a network function.

In terms of messaging, and in some but not necessarily all embodiments, the apparatus 800 can receive, transmit, or both receive and transmit, via the network interface, various messages as follows. Other messages can also be received or transmitted. The apparatus can receive trigger messages 880a indicative that the apparatus is to operate a particular network function during a particular time. In some embodiments the trigger messages include or indicate executable code for implementing the network function. The apparatus 800 can receive target location information messages 880b from other network nodes. The apparatus 800 can receive network node location messages 880c from other network nodes. The apparatus can transmit trigger messages 885 to other nodes, for causing the other nodes to operate the network function. Trigger messages can thereby be used to transfer the network function operation from node to node. The apparatus can also transmit and receive network function messages 890, which are messages communicated in accordance with an operation of the network function itself. The apparatus can also transmit node location advertisement messages (not shown) indicative of current or future node location. Advertisements of location can be used in support of determining locations of network nodes.

Figure 9:
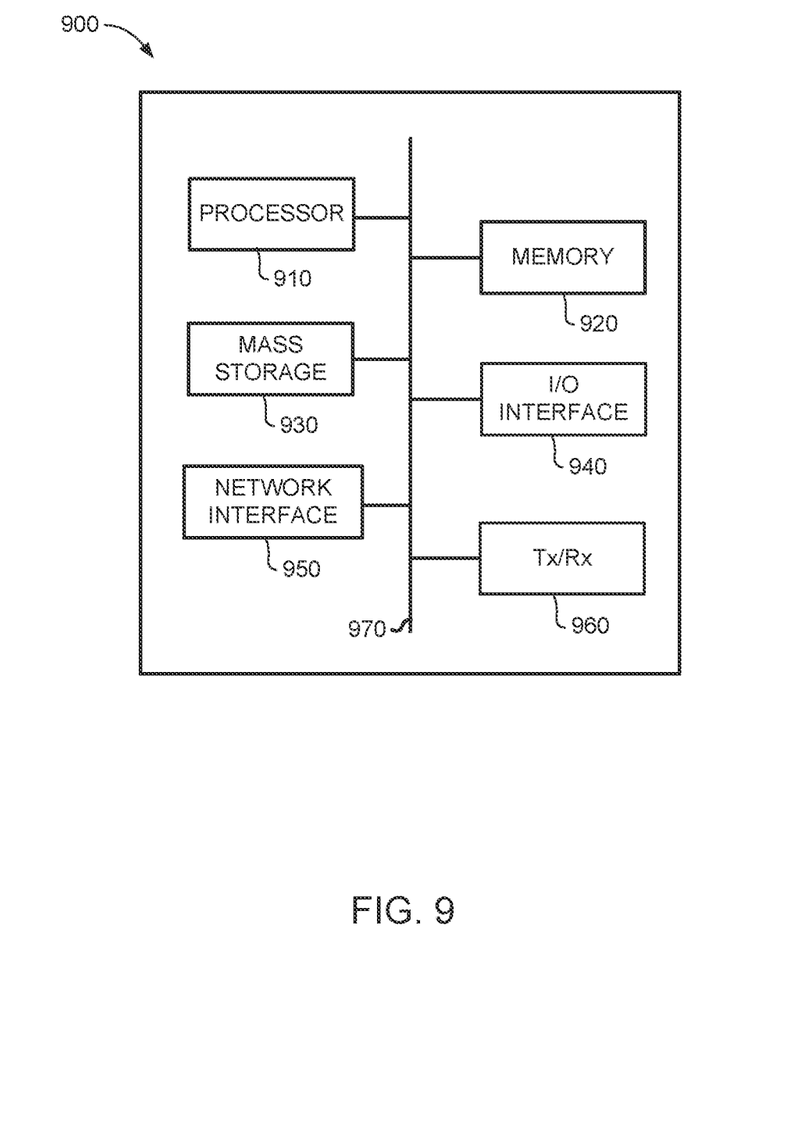
FIG. 9 illustrates an apparatus provided according to an embodiment of the present invention.

FIG. 9 is a schematic diagram of an electronic device 900 that may perform any or all of operations of the above methods and features explicitly or implicitly described herein, according to different embodiments of the present invention. For example, a computer equipped with network function may be configured as electronic device 900.

As shown, the device includes a processor 910, such as a Central Processing Unit (CPU) or specialized processors such as a Graphics Processing Unit (GPU) or other such processor unit, memory 920, non-transitory mass storage 930, I/O interface 940, network interface 950, and a transceiver 960, all of which are communicatively coupled via bi-directional bus 970. According to certain embodiments, any or all of the depicted elements may be utilized, or only a subset of the elements. Further, the device 900 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 920 may include any type of non-transitory memory such as static random access memory (SRAM), dynamic random access memory (DRAM), synchronous DRAM (SDRAM), read-only memory (ROM), any combination of such, or the like. The mass storage element 930 may include any type of non-transitory storage device, such as a solid state drive, hard disk drive, a magnetic disk drive, an optical disk drive, USB drive, or any computer program product configured to store data and machine executable program code. According to certain embodiments, the memory 920 or mass storage 930 may have recorded thereon statements and instructions executable by the processor 910 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An electronic apparatus comprising a processor, a memory and a communication interface and configured to:
   determine locations of one or more target devices to be serviced by one or more network functions;
   determine locations of a plurality of moving network nodes; and
   cause the one or more network functions to operate at a first group of the moving network nodes during a first specified time interval, said first group of the moving network nodes comprising a first one or more of the moving network nodes selected based on the locations of the one or more target devices in combination with the locations of the plurality of moving network nodes during the first specified time interval, in order to satisfy one or more operational criteria during the first specified time interval; and
   cause the one or more network functions to operate at a second group of the moving network nodes during a second specified time interval, said second group of the moving network nodes comprising a second one or more of the moving network nodes selected based on the locations of the one or more target devices in combination with the locations of the plurality of moving network nodes during the second specified time interval, in order to satisfy one or more second operational criteria during the second specified time interval.

2. The electronic apparatus of claim 1, wherein the electronic apparatus is part of one of said plurality of moving network nodes at which the one or more network functions operate during the first specified time interval.

3. The electronic apparatus of claim 2, wherein said selecting is performed by the electronic apparatus.

4. The electronic apparatus of claim 1, wherein the electronic apparatus is part of a network node at which one of the network functions operates at a time prior to the first specified time interval.

5. The electronic apparatus of claim 1, wherein the electronic apparatus is separate from the plurality of moving network nodes, or wherein the electronic apparatus is part of an arbitrary one of the plurality of moving network nodes.

6. The electronic apparatus of claim 1, wherein the electronic apparatus is distributed across two or more separate networked devices cooperatively configured to perform one or more of: said determining locations of target devices; said determining locations of said plurality of moving network nodes; and said causing the one or more network functions to operate at the first group of the moving network nodes during the first specified time interval.

7. The electronic apparatus of claim 6, wherein the two or more separate networked devices include at least one of the plurality of moving network nodes, or wherein the two or more separate networked devices include two or more of the plurality of moving network nodes.

8. The electronic apparatus of claim 1, wherein said one or more first group of the moving network nodes are selected to be proximate to the one or more target devices during the first specified time interval.

9. The electronic apparatus of claim 1, wherein causing the one or more network functions to operate at the first group of the network nodes during the first specified time interval comprises:
  causing a first network function of the one or more network functions to operate at the first group of the moving network nodes, the first group of the moving network nodes selected in order to satisfy a first operational criteria; and
  wherein causing the one or more network functions to operate at the second group of the moving network nodes during the second specified time interval comprises: causing a second network function of the one or more network functions to operate at the second group of the moving network nodes, the second group of the moving network nodes selected in order to satisfy a second operational criteria different from the first operational criteria.

10. The electronic apparatus of claim 1, wherein the one or more target devices are mobile or the one or more target devices are stationary, and wherein the moving network nodes move according to a predetermined predictable pattern, some or all of the network nodes are satellite network nodes in non-geostationary orbit, or a combination thereof.

11. A system comprising a plurality of electronic apparatuses, each corresponding to a respective one of a plurality of moving network nodes, the system configured, by cooperative action of the electronic apparatuses that comprise processors, to:
  determine locations of one or more target devices to be serviced by one or more network functions;
  determine locations of the plurality of moving network nodes;
  cause the one or more network functions to operate at a first group of the moving network nodes during a first specified time interval, said first group of the moving network nodes comprising a first one or more of the moving network nodes selected based on the locations of the one or more target devices in combination with the locations of the plurality of moving network nodes during the first specified time interval, in order to satisfy one or more operational criteria during the first specified time interval; and
  cause the one or more network functions to operate at a second group of the moving network nodes during a second specified time interval, the second group of the moving network nodes comprising a second one or more of the moving network nodes selected based on the locations of the one or more target devices in combination with the locations of the plurality of moving network nodes during the second specified time interval, in order to satisfy one or more second operational criteria during the second specified time interval.

12. The system of claim 11, wherein said first group of the moving network nodes are selected to be proximate to the one or more target devices during the first specified time interval.

13. A method, performed by one or more electronic apparatuses in a network, the method comprising:
  determining locations of one or more target devices to be serviced by one or more network functions;
  determining locations of a plurality of moving network nodes;
  causing the one or more network functions to operate at a first group of the moving network nodes during a first specified time interval, said first group of the moving network nodes comprising a first one or more of the moving network nodes selected based on the locations of the one or more target devices in combination with the locations of the plurality of moving network nodes during the first specified time interval, in order to satisfy one or more operational criteria during the first specified time interval; and
  causing the one or more network functions to operate at a second group of the moving network nodes during a second specified time interval, said second group of the moving network nodes comprising a second one or more of the moving network nodes selected based on the locations of the one or more target devices in combination with the locations of the plurality of moving network nodes during the second specified time interval, in order to satisfy one or more second operational criteria during the second specified time interval.

14. The method of claim 13, wherein the electronic apparatus is part of one of said plurality of moving network nodes at which the one or more network functions operate during the first specified time interval, or wherein the electronic apparatus is part of a network node at which one of the network functions operates at a time prior to the first specified time interval.

15. The method of claim 13, wherein the electronic apparatus is separate from the plurality of moving network nodes, or wherein the electronic apparatus is part of an arbitrary one of the plurality of moving network nodes.

16. The method of claim 13, wherein the electronic apparatus is distributed across two or more separate networked devices cooperatively configured to perform one or more of: said determining locations of target devices; said determining locations of said plurality of moving network nodes; and said causing the one or more network functions to operate at the first group of the moving network nodes during the first specified time interval.

17. The method of claim 13, wherein said first group of the moving network nodes are selected to be proximate to the one or more target devices during the first specified time interval.

18. The method of claim 13, wherein the target device is mobile or the target device is stationary, and wherein the moving network nodes move according to a predetermined predictable pattern, some or all of the network nodes are satellite network nodes in non-geostationary orbit, or a combination thereof.

* * * * *

UNITED STATES PATENT AND TRADEMARK OFFICE
CERTIFICATE OF CORRECTION

| | |
|---|---|
| PATENT NO. | : 11,533,595 B2 |
| APPLICATION NO. | : 17/175520 |
| DATED | : December 20, 2022 |
| INVENTOR(S) | : Mehdi Arashmid Akhavain Mohammadi and Peter Ashwood-Smith |

It is certified that error appears in the above-identified patent and that said Letters Patent is hereby corrected as shown below:

In the Claims

Column 19, Lines 16-17, Claim 8, "wherein said one or more first group" should be --wherein said first group--

Signed and Sealed this
Fourteenth Day of March, 2023

Katherine Kelly Vidal
*Director of the United States Patent and Trademark Office*